March 29, 1955  K. H. STOKES  2,704,937
MEASURING INSTRUMENT HAVING LINKAGE
PREVENTNG OVERTRAVEL OF INDICATOR
Filed May 24, 1951  2 Sheets-Sheet 1

INVENTOR.
KONRAD H. STOKES
BY Arthur H. Swanson
ATTORNEY.

March 29, 1955
K. H. STOKES
2,704,937
MEASURING INSTRUMENT HAVING LINKAGE
PREVENTNG OVERTRAVEL OF INDICATOR
Filed May 24, 1951
2 Sheets-Sheet 2
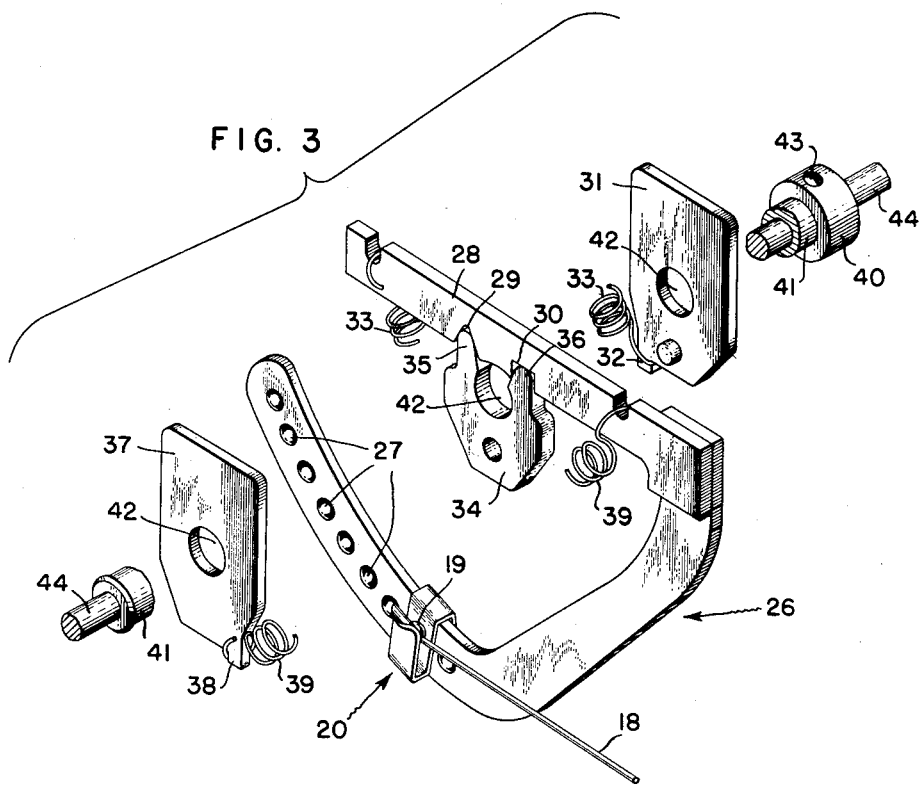
INVENTOR.
KONRAD H. STOKES
BY Arthur H. Swanson
ATTORNEY.

United States Patent Office 2,704,937
Patented Mar. 29, 1955

2,704,937

MEASURING INSTRUMENT HAVING LINKAGE PREVENTING OVERTRAVEL OF INDICATOR

Konrad H. Stokes, Roslyn, Pa., assignor to Minneapolis-Honeywell Regulator Company, Minneapolis, Minn., a corporation of Delaware Application May 24, 1951, Serial No. 227,967

4 Claims. (Cl. 73—430)

This invention relates to indicators and recorders. More specifically, it relates to instruments which have a driving element consisting of a Bourdon tube or spiral, a driven element consisting of an indicating pointer or recording pen, and a linkage therebetween to transmit the motion of the driving element to the driven element. The driving element is responsive to changes in the variable being measured. This variable is usually temperature, pressure, or rate of flow.

It is an object of this invention to provide such a linkage in which there are means for permitting overtravel or movement of the driving element relative to the driven element. Such an overtravel provision allows the driving element to vibrate at a high speed which would give a false indication if it were transmitted to the driven or indicating element. By the provision of a yielding connection between the driving element and the driven element such vibrations are absorbed in the linkage and not transmitted to the driven element.

More specifically, it is an object of this invention to provide a linkage having a yielding connection formed of a lever having a rectangular notch and a V-shaped notch in it, a support for said lever having two pins suitably spaced to enter said notches, and springs biasing said lever for yielding motion from its normal position in which said pins are in said notches.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 3 is an exploded perspective view of those parts of the linkage constituting the overtravel mechanism.

Figure 1:
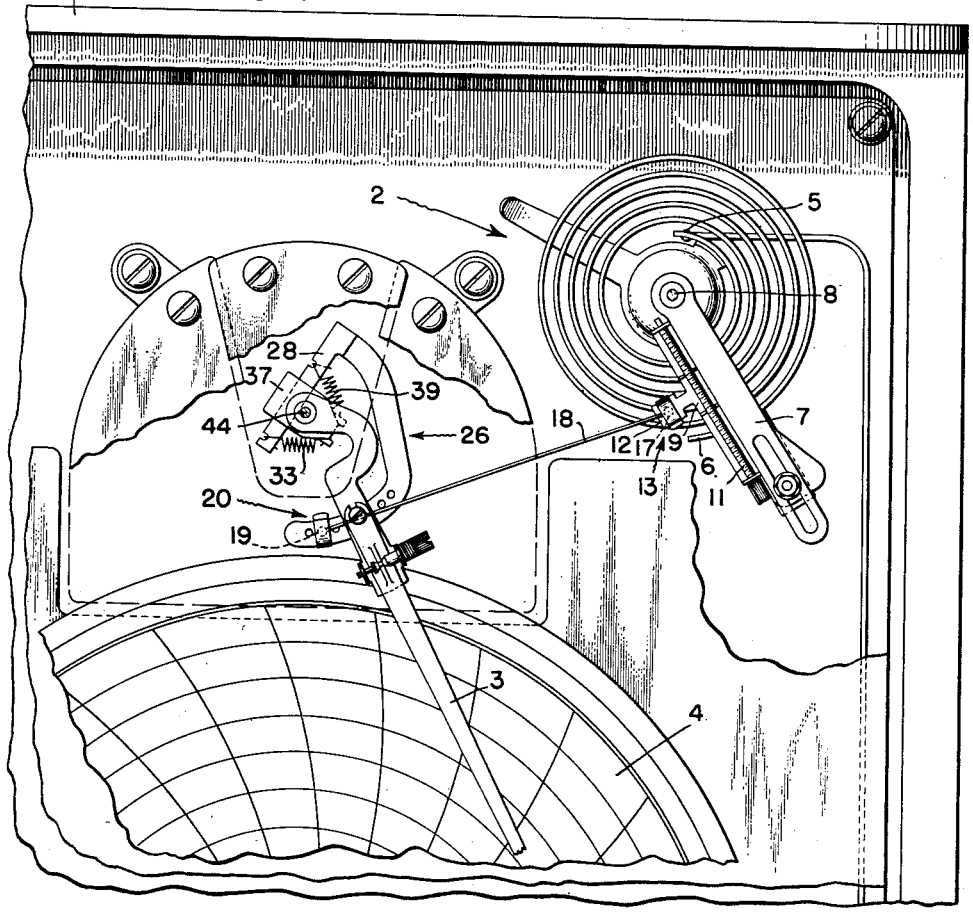
Fig. 1 is a partial front elevation of a meter with the cover of the casing removed.
Figure 2:
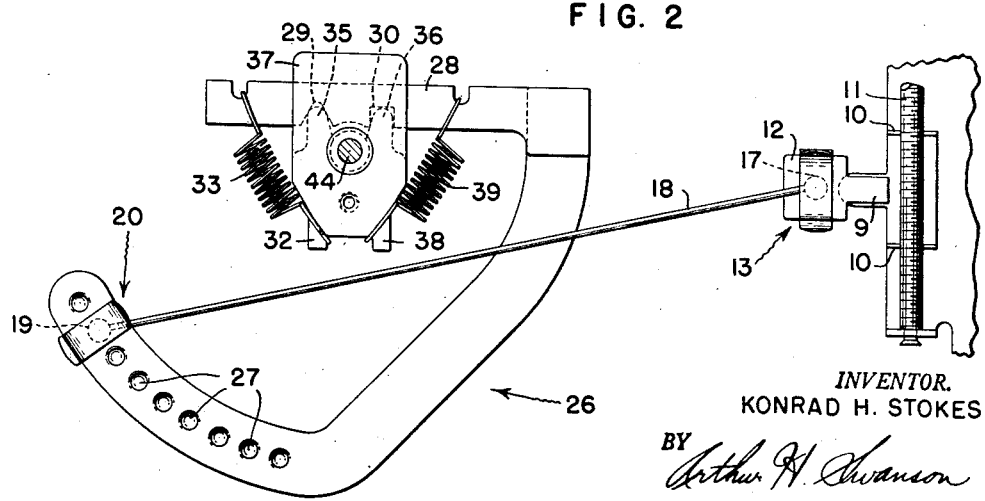
Fig. 2 is a vertical transverse cross section on an enlarged scale of a portion of the linkage.

The device of this invention comprises an instrument having a casing 1 usually in the form of a rectangular box having a front door or cover (not shown). In this casing is mounted a driving element (generally indicated at 2) comprising a Bourdon tube or spiral. Driving element 2 drives a linkage to be described more fully hereinafter and also drives a driven element comprising an indicating pointer or recording pen 3 which cooperates with a chart 4 rotated at a uniform speed.

Driving element 2 has its inner end 5 fixed so as to be stationary. The outer end 6 is movable and is attached to a lever 7 which is centrally pivoted about a stationary pivot 8. This central pivot or support constrains the driving element 2 to a single mode of vibration and thus eliminates many undesirable movements not resulting from the variable being measured.

Lever 7 is attached to a substantially T-shaped plate 9 which has a pair of forwardly projecting, notched arms 10 engaging the manually adjustable screw 11. Plate 9 has in its base or vertical arm 12 an indentation in one face and a projection from the other face. This indentation and this projection are aligned with each other.

A spring clip (generally indicated at 13), secures ball 17 to T-shaped plate 9 by means of the projection and indentation therein. A second spring clip (generally indicated at 20) secures ball 19 to a lever (generally indicated at 26). Link 18 carries balls 17 and 19 at its opposite ends.

Lever 26 has a plurality of perforations or cavities 27 in it. Cavities 27 are of suitable size and shape to cooperate with clip 20 and ball 19 to form a readily attachable or detachable ball-and-socket joint or connection between link 18 and lever 26. This joint or connection can be adjusted to vary the over-all length of the linkage by selecting one of the perforations or cavities 27.

At its opposite end lever 26 has an arm 28 which contains a complementary faces forming a V-shaped notch 29 and a rectangular notch 30. Cooperating with notches 29 and 30 is a pivot formed of an outer plate 31 having a projection 32 thereon which serves for the connection of one end of a spring 33 secured at its other end to arm 28 of lever 26. The pivot also is made up of a center plate 34 having projections 35 and 36 extending upwardly therefrom and having faces thereon so as to be received by notches 29 and 30. The pivot also comprises a third plate 37 having a projection 38 extending downwardly therefrom so as to receive one end of spring 39 secured at its opposite end to arm 28 of lever 26. Plates 31, 34, and 37 are secured together so that they form one unitary element. The confronting faces of side plates 31 and 37 abut the sides of arm 28 and form guides for lever 26 in its rocking motion about the projections 35 and 36 and a bushing (generally indicated at 40). Bushing 40 has a smaller diameter 41 which has a forced fit for engagement with holes 42 in plates 31, 34, and 37 so that the pivot is fast on bushing 40 which is secured by means of pin 43 to index shaft 44. Shaft 44 carries the indicator or recorder hand 3 (Fig. 1).

*Operation*

When a change in the variable being measured is felt by Bourdon tube or spiral 2, it causes the free end 6 to rotate and thereby turn lever 7 about its central, stationary pivot 8. Rotation of lever 7 carries T-shaped plate 9 with it so that clip 13 moves link 18 by means of the ball 17 secured in clip 13. The opposite end of link 18 is secured by means of clip 20 to lever 26 because ball 19 is held by clip 20. Relatively slow movement of driving element 2 and consequently of lever 26 causes lever 26 to turn index shaft 44 without extending springs 33 or 39. However, if an excess torque occurs, such as an undesired vibration due to a sudden extraneous motion of driving element 2 or a part of the linkage, lever 26 turns in the direction of the torque and stretches either spring 33 or 39 permitting arm 28 to rock about projection 35 or projection 36 as the case may be. This stretching of springs 33 and 39 permits overtravel of the driving element 2 without corresponding false movement of the indicator or recorder pen 3.

Reference is made to co-pending application S. N. 227,952 by John G. Booth and to co-pending application S. N. 227,970 by Charles E. West, assigned to the owner of this case, which show and claim certain features disclosed but not claimed in this case.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In an indicating instrument having an element movable in accordance with the variations in a condition and a second element for indicating said variations, damping and motion transmitting means interposed between said elements and including, a shaft mounting said indicating element for rotation, a lever mounted transversely of said shaft for movement by said first element, guides limiting the movement of said lever to a rocking movement transverse to the axis of rotation of said second element, means on opposite sides of said shaft having faces adapted to be interengaged with complementary faces, said lever having such complementary faces interengaged with the first of said faces when said lever is in normal position with respect to said shaft, and springs connected to said lever and to said second element and yieldably urging said lever toward said normal position.

2. In an indicating instrument, means for transmitting movements of a measuring element to an indicating element rotatable about a fixed axis, said means including, a shaft on which said indicating element is mounted for rotation about said axis, a pair of projections extending from said shaft and circumferentially spaced from one another about said shaft, a pair of plates mounted on said shaft and spaced from each other longitudinally of said shaft and having flat confronting faces forming guides, a lever mounted between said guides and extending transversely of said shaft and having notches therein spaced circumferentially of said shaft at the same distance as said projections, said projections being located in said notches when said lever is in its normal position, and a pair of coil springs each attached at one end to said shaft and each attached at its other end to said lever at a point spaced from the point of attachment of the other spring and on the opposite side of said shaft, whereby said springs yieldingly urge said lever toward its normal position.

3. In a gauge having a driving element responsive to the changes in the variable being measured and a driven element for indicating said changes, a linkage for transmitting movement from said driving element to said driven element and including, a lever having a substantially V-shaped indentation and a substantially rectangular indentation therein, said indentations being located on opposite sides of a plane defined by a straight line forming an axis and a point intermediate the ends of said lever, said lever being mounted for rocking movement about said axis, a rigid pivot secured to said driven element and having a pair of rounded projections thereon spaced from one another and located on opposite sides of said plane and normally engaging said lever and interfitting with said indentations and providing rocking movement between said lever and said pivot, and spring means in addition to said pivot yieldingly urging said lever and said pivot toward an intermediate position in the relative movement between said lever and said pivot in which position said projections are engaged in said indentations.

4. Means for transmitting movement between the measuring element and the indicating element of a gauge and for damping said movement, including, a shaft on which said indicating element is mounted for rotation about an axis, a cooperating element mounted for limited rocking movement about said axis by said measuring element, interengaging projections and notches between said shaft and said cooperating element, said notches and projections being spaced from each other transversely and on opposite sides of said axis, said projections being spaced from each other transversely and on opposite sides of said axis, and spring means urging said notches and projections into engagement with each other, whereby said element normally rotates said shaft but is free to move for a limited distance in either direction relative to said shaft.

References Cited in the file of this patent

UNITED STATES PATENTS

| | | |
|---|---|---|
| 1,195,750 | Trane | Aug. 22, 1916 |
| 2,203,057 | Moore | June 4, 1940 |
| 2,307,248 | Ullman et al. | Jan. 5, 1943 |
| 2,325,326 | Kiene | July 27, 1943 |